Figure 1:
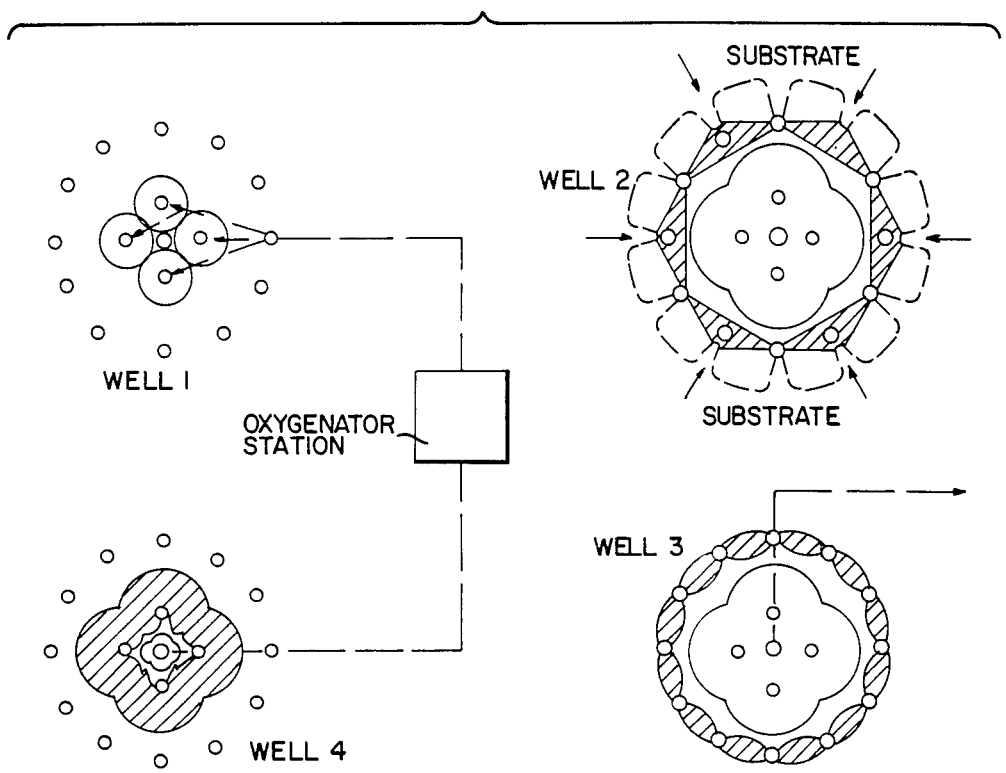

United States Patent [19]

Hallberg et al.

[11] Patent Number: 4,683,064
[45] Date of Patent: Jul. 28, 1987

[54] PROCESS FOR DECREASING THE NITRATE CONTENT IN WATER

[76] Inventors: Rolf O. Hallberg, Skolvägen 11A, S-13500 Tyresö; Rudolf H. Martinell, Rågvägen 4A, S-18365 Täby, both of Sweden

[21] Appl. No.: 756,972
[22] PCT Filed: Dec. 17, 1984
[86] PCT No.: PCT/SE84/00432
§ 371 Date: Jul. 9, 1985
§ 102(e) Date: Jul. 9, 1985
[87] PCT Pub. No.: WO85/03067
PCT Pub. Date: Jul. 18, 1985

[30] Foreign Application Priority Data

Jan. 16, 1984 [SE] Sweden ............................. 8400190

[51] Int. Cl.$^4$ ............................................. C02F 1/72
[52] U.S. Cl. ........................... 210/605; 210/610; 210/747; 210/903
[58] Field of Search .............. 210/610, 747, 903, 170, 210/605, 722

[56] References Cited

U.S. PATENT DOCUMENTS 4,576,717  3/1986  Collin et al. ................ 210/747 X

FOREIGN PATENT DOCUMENTS

| 1086863 | 8/1983 | European Pat. Off. |
| 7502197 | 8/1976 | Sweden |
| 354264 | 11/1981 | Sweden |
| 8206393 | 7/1984 | Sweden |
| 1553620 | 2/1976 | United Kingdom |

Primary Examiner—Tom Wyse

[57] ABSTRACT

The invention relates to a process for decreasing the content of nitrate in ground water, artificial ground water, that is infiltrated surface water, or surface water flowing through an aquifer or through a basin or a filter containing naturally occurring filter material. Water containing denitrification organisms and/or substrate therefore is introduced intermittently through a number of injection wells or injection pipes arranged around one or more extraction wells or extraction pipes for purified water. During each introduction of water containing denitrification organisms and/or substrate therefore said water is fed to only some of said injection wells or pipes and simultaneously water is drawn from nearby, adjacent or intervening injection wells or pipes for the purpose of creating a denitrification zone at a distance sufficiently far from the extraction well or extraction pipe.

2 Claims, 2 Drawing Figures

PROCESS FOR DECREASING THE NITRATE CONTENT IN WATER

The present invention relates to a process for decreasing the content of nitrate in ground water, artificial ground water, that is infiltrated surface water, or surface water.

In certain areas, especially intensively cultivated areas, ground water and surface water may contain nitrate contents so high that it will be necessary to reduce said contents to levels below the existing limit value for nitrate in drinking water.

SE-A-7502197-2 describes a process for removing noxious nitrogen compounds, e.g. nitrates, from water, especially ground water. In said process water containing denitrification microorganisms is introduced continuously or intermittently into an aquifer around a ground water well. The present invention is an improvement of said known process wherein a clearly defined denitrification zone is formed at a desired distance from an extraction well, thereby permitting an optimal nitrate reduction in the water to be purified.

Thus, the present invention relates to a process for decreasing the content of nitrate in ground water, artificial ground water, that is infiltrated surface water, or surface water flowing through an aquifer or through a basin or a filter containing naturally occurring filter material, in which process water containing denitrification organisms and/or substrate therefore is introduced intermittently through a number of injection wells or injection pipes arranged around one or more extraction wells or extraction pipes for purified water. This process is characterized in that, during each introduction of water containing denitrification organisms and/or substrate therefore, said water is fed to only some of the injection wells or injection pipes, and that simultaneously water is drawn from nearby, adjacent or intervening injection wells or injection pipes for the purpose of creating a denitrification zone at a distance sufficiently far from the extraction well or extraction pipe.

The water fed to some of the injection wells may consist of a portion of the water drawn from the extraction well and/or water drawn from other, nearby injection wells.

If water containing denitrification organisms and/or substrate therefore is introduced into injection wells and simultaneously water is pumped from the extraction well but no water is pumped from one or more of the injection wells, the water added will flow in narrow zones from the respective injection wells directly towards the extraction well. This means that the injection water will not cover the whole area between the injection wells, and impure water will flow between said narrow zones directly towards the extraction well. In such a case the purification process will not work satisfactorily, resulting in a deteriorated water quality.

On the other hand, if in accordance with the invention water is introduced into some injection wells and simultaneously water is drawn from adjacent or intervening injection wells the water thus introduced will flow in the aquifer in a manner such that the areas between the injection wells are covered completely, with a concomitant formation of a clearly defined denitrification zone at a distance sufficiently far from the extraction well. All water drawn from the extraction well will thus pass through said zone, whereby the best possible nitrate reduction is attained.

The preferred embodiment of the invention, viz. decreasing the nitrate content in situ in an aquifer, will be described in greater detail below.

Nitrate ions may be eliminated from ground water by activating denitrification organisms normally existing in the aquifer. If necessary, denitrification organisms have to be added at an early stage. The microorganisms utilized require a supply of organic carbon to bring about a denitrification. Examples of useful substrates are sucrose, methanol, ethanol, an acetate or molasses. The substrate is dissolved in or mixed with the water introduced through the injection wells.

If a sufficiently large strain of denitrification organisms is available all the organic carbon injected will be utilized for denitrification. A certain amount of substrate will then result in the reduction of a given amount of nitrate to nitrogen gas.

Field tests have shown that it is possible to activate microbial processes in the ground by means of substrate injections. This results in a lowering of the nitrate content by denitrification. Thus, the nitrate content in ground water has been decreased from about 50 mg/l to values below 10 mg/l.

The creation of reducing conditions also results in other effects, viz. that the content of dissolved manganese in the water increases and that residual nitrite may be present. Said changes are not desirable from a water hygienic point of view but they are completely reversible if the water is degassed and oxygenated. Consequently, from a biological point of view it is quite clear that reduction and subsequent oxidation may bring about a practically complete elimination of nitrate without changing the water quality in other respects.

Two essentially different technical solutions are conceivable for applying the method in practice.

(1) Two zones, one reduced and one oxidized, are created around one and the same well. When drawing water from the well the water will be filtered through said zones and thus be purified.

(2) Reducing and oxidizing environments respectively are created around different wells.

Figure 2:
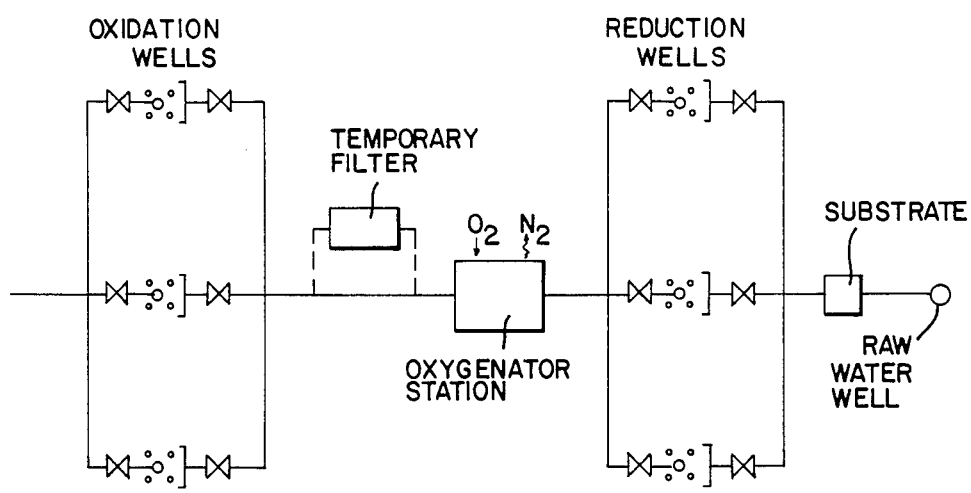

Said two solutions are illustrated in the drawing FIGS. 1 and 2.

(1) Two zones around one well.

FIG. 1 shows four wells in a system for microbiologic nitrate reduction. Around all the wells there is a gallery of injection wells arranged as two circles at different distances from the central extraction well. In the outer circle of injection wells water is circulated by pumping and simultaneously substrate is added (well 2). A more or less annular zone enriched with organic substance is formed in this way. The substrate is utilized by denitrification organisms which reduce nitrate to nitrogen. A secondary effect of the reducing environment in the aquifer is that the nitrite content may be slightly increased and that manganese may be dissolved in a first phase. An oxidized zone nearer the extraction well has therefore been formed earlier by means of nitrate free water oxygenated in an oxygenator (well 1). After a certain contact time a volume of purified water corresponding to the treatment made may be supplied (well 3). During the extraction of this water volume, nitrate free but not oxygenated water has flown into the zone adjacent to the extraction well (well 4) and this water may, via an oxygenator, be pumped over to the inactive well 1. All wells are used in sequence in this manner, sometimes as supply well and sometimes for other functions.

(2) Zones created around separate wells.

Water pumped from a raw water well (see FIG. 2) is treated with substrate and then infiltrated in injection wells around special treatment wells. The infiltration is carried out in accordance with the invention. Reducing zones are thus formed in the aquifer around said wells, and in said zones nitrate is reduced microbiologically to nitrogen. After a certain contact time the water, which is now free from nitrate but may contain residual nitrite, is pumped over to another well system. The water is degassed and oxygenated in an oxygenator station before the infiltration in said second well system. In the oxidizing aquifer the residual nitrite, if any, is oxidized back to nitrate. Water drawn from a reduction well will contain a certain amount of manganese. After oxygenation of the water this manganese has to be separated, e.g. in a rapid filter, so that no clogging will occur when introducing the water into injection wells around an oxidation well.

The process according to the invention may also be used for the purification of ground water or surface water in e.g. a basin or a filter containing naturally occurring filter material. For instance, soil may be excavated to form a cavity, and a sealing layer of clay, concrete, plastics tarpaulin or the like may be applied along the mantle surface. Infiltration pipes or drain pipes for raw water are applied inside the mantle of the basin thus prepared, whereupon the basin is filled with filter material, e.g. sand. Purified water is drawn from an extraction pipe or extraction well in the centre, and injection pipes are arranged between the mantle and the centre. A filter container of steel or plastics or other material may be employed instead of such a basin. Raw water is introduced inside the mantle of such a filter container, and purified water is drawn from an extraction pipe in the centre. Injection pipes are arranged between the mantle and the centre. In the devices described above there will be a radial flow of raw water from the periphery towards the centre of a basin or filter container, but it is also possible to arrange for flow paths in the opposite direction, that is, from the centre to the mantle. Alternatively the raw water flow may be axial. Thus, raw water may be fed to one end of the filter container and purified water withdrawn from the other end. In this case injection pipes are disposed in suitable positions between the inlet end and the outlet end.

I claim:

1. In a process for decreasing the content of nitrate in ground water, which ground water can include infiltrated surface water, or surface water flowing through an aquifer or basin containing filter material, wherein treatment water containing denitrification organisms and/or substrate for such organisms is introduced intermittently through a number of injection wells or injection pipes arranged around an extraction well or extraction pipe for extracting purified water, the improvement which comprises, feeding said treatment water to some of the injection wells or injection pipes, while simultaneously drawing water from the remaining injection wells or injection pipes for the purpose of creating between the injection wells or injection pipes an annular denitrification zone spaced from the extraction well or extraction pipe, passing ground water through said denitrification zone and withdrawing said purified water from said extraction well or pipe.

2. A process according to calim 1, characterized in that, in order to oxidize manganese and residual nitrite in the water, an oxidation zone is created between the denitrification zone and the extraction well or extraction pipe by an intermittent introduction of water containing oxygen or oxygen-releasing substances through a number of second injection wells or injection pipes arranged around said extraction well or extraction pipe.

* * * * *